(12) United States Patent
Buck, Jr. et al.

(10) Patent No.: US 11,037,434 B2
(45) Date of Patent: Jun. 15, 2021

(54) SYSTEMS AND METHODS FOR MONITORED INDIVIDUAL VIOLATION INSTRUCTION

(71) Applicant: BI Incorporated, Boulder, CO (US)

(72) Inventors: James J. Buck, Jr., Longmont, CO (US); Joseph P. Newell, Louisville, CO (US); Dustin Pettit, Boulder, CO (US); Mike Cooke, Boulder, CO (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 16/221,497

(22) Filed: Dec. 15, 2018

(65) Prior Publication Data

US 2019/0206229 A1 Jul. 4, 2019

Related U.S. Application Data

(60) Provisional application No. 62/612,650, filed on Jan. 1, 2018.

(51) Int. Cl.
| | | |
|---|---|---|
| G08B 23/00 | (2006.01) |
| G08B 25/01 | (2006.01) |
| G08B 21/22 | (2006.01) |
| H04W 4/029 | (2018.01) |
| H04L 29/08 | (2006.01) |
| G06Q 50/26 | (2012.01) |

(Continued)

(52) U.S. Cl.
CPC ....... *G08B 25/016* (2013.01); *G01C 21/3461* (2013.01); *G01S 5/0027* (2013.01); *G06F 1/3212* (2013.01); *G06F 1/3296* (2013.01); *G06Q 50/26* (2013.01); *G08B 21/0258* (2013.01); *G08B 21/0269* (2013.01); *G08B 21/0288* (2013.01); *G08B 21/182* (2013.01);
*G08B 21/22* (2013.01); *G08B 21/24* (2013.01); *G08B 25/10* (2013.01); *H04L 67/22* (2013.01); *H04L 67/36* (2013.01); *H04W 4/021* (2013.01); *H04W 4/029* (2018.02); *H04W 52/028* (2013.01); *H04W 52/0277* (2013.01); *G01S 2205/002* (2013.01); *G01S 2205/008* (2013.01)

(58) Field of Classification Search
CPC .............. G08B 25/016; G08B 21/0258; G08B 21/0269; G08B 21/0288; G08B 21/182; G08B 21/22; G08B 21/24; G08B 25/10; H04W 4/029; H04W 4/021; H04W 52/0277; H04W 52/028; G01C 21/3461; G01S 5/0027; G01S 2205/002; G01S 2205/008; G06F 1/3212; G06F 1/3296; G06Q 50/26; H04L 67/22
USPC ...................................................... 340/573.1
See application file for complete search history.

(56) References Cited

U.S. PATENT DOCUMENTS 4,724,427 A 2/1988 Carroll
5,731,757 A * 3/1998 Layson, Jr. .......... G08B 21/028
340/5.61

(Continued)

FOREIGN PATENT DOCUMENTS

WO WO/1998/08204 2/1998
WO WO/2000/077688 12/2000

*Primary Examiner* — Zhen Y Wu
(74) *Attorney, Agent, or Firm* — HDC Intellectual Property Law, LLP

(57) ABSTRACT

Various embodiments provide systems and method for monitoring individuals including, but not limited to, communication of information selectively to and from a user attached monitor device and a user detached monitor device.

19 Claims, 7 Drawing Sheets

(51) Int. Cl.
  *G08B 21/24* (2006.01)
  *G08B 25/10* (2006.01)
  *G01C 21/34* (2006.01)
  *G01S 5/00* (2006.01)
  *G06F 1/3212* (2019.01)
  *G06F 1/3296* (2019.01)
  *G08B 21/18* (2006.01)
  *H04W 52/02* (2009.01)
  *G08B 21/02* (2006.01)
  *H04W 4/021* (2018.01)

(56) References Cited

U.S. PATENT DOCUMENTS

| | | | |
|---|---|---|---|
| 6,130,620 A | 10/2000 | Pinnow | |
| 6,169,484 B1 | 1/2001 | Schuman | |
| 6,323,773 B1 | 11/2001 | Runyon | |
| 6,393,362 B1 | 5/2002 | Burns | |
| 7,015,817 B2 | 3/2006 | Copley | |
| 7,119,695 B2 * | 10/2006 | Defant | G08B 21/0286 340/573.4 |
| 7,619,533 B2 | 11/2009 | Crucilla | |
| 7,886,648 B2 | 2/2011 | Williams | |
| 7,905,832 B1 | 3/2011 | Lau | |
| 7,930,927 B2 | 4/2011 | Cooper | |
| 8,352,111 B2 | 1/2013 | Mudalige | |
| 8,493,219 B2 | 7/2013 | Buck | |
| 8,576,065 B2 | 11/2013 | Buck | |
| 8,629,776 B2 | 1/2014 | Buck | |
| 8,952,805 B2 | 2/2015 | Baines et al. | |
| 9,092,963 B2 * | 7/2015 | Fetzer | G08B 25/016 |
| 9,240,118 B2 | 1/2016 | Melton | |
| 9,355,548 B2 | 5/2016 | Buck | |
| 9,423,487 B2 | 8/2016 | Buck | |
| 9,629,420 B2 | 4/2017 | Cooper | |
| 9,668,095 B1 | 5/2017 | Newell | |
| 9,989,649 B2 | 6/2018 | Buck | |
| 9,990,826 B1 * | 6/2018 | Hodge | G08B 21/22 |
| 10,068,462 B2 | 9/2018 | Buck | |
| 2003/0222781 A1 | 12/2003 | Defant et al. | |
| 2004/0174264 A1 * | 9/2004 | Reisman | G08B 21/0202 340/573.4 |
| 2005/0040944 A1 * | 2/2005 | Contestabile | G08B 21/028 340/539.13 |
| 2007/0014264 A1 | 1/2007 | Davis | |
| 2007/0023496 A1 * | 2/2007 | Hall | G07C 9/28 235/375 |
| 2007/0125816 A1 * | 6/2007 | Myers | A44C 5/0007 224/221 |
| 2007/0171047 A1 * | 7/2007 | Goodman | G01S 5/0072 340/539.13 |
| 2007/0285258 A1 | 12/2007 | Hartman | |
| 2008/0012760 A1 | 1/2008 | Derrick | |
| 2008/0018459 A1 * | 1/2008 | Derrick | G08B 21/0269 340/539.13 |
| 2011/0093876 A1 * | 4/2011 | Belz | G08B 21/0423 725/12 |
| 2011/0154887 A1 | 6/2011 | Cooper | |
| 2011/0195722 A1 | 8/2011 | Walter et al. | |
| 2011/0199205 A1 | 8/2011 | Kremi | |
| 2011/0237726 A1 | 9/2011 | Dhuna | |
| 2011/0260870 A1 * | 10/2011 | Bailey | A61B 5/6831 340/573.1 |
| 2012/0105225 A1 * | 5/2012 | Valtonen | A61B 5/1112 340/539.13 |
| 2013/0328678 A1 * | 12/2013 | Shechter | G08B 21/22 340/539.13 |
| 2014/0039804 A1 | 2/2014 | Park | |
| 2014/0081106 A1 * | 3/2014 | Shnaper | A61B 5/14546 600/365 |
| 2014/0136609 A1 * | 5/2014 | Churchill | H04L 51/046 709/203 |
| 2014/0179342 A1 | 6/2014 | Hamerly | |
| 2014/0368601 A1 * | 12/2014 | deCharms | H04W 4/029 348/14.02 |
| 2015/0123766 A1 | 5/2015 | St. John | |
| 2015/0356261 A1 | 12/2015 | Brust | |
| 2016/0110987 A1 * | 4/2016 | Hughes | H04W 4/029 340/573.4 |
| 2016/0154643 A1 | 6/2016 | Zhang | |
| 2016/0267770 A1 * | 9/2016 | Keays | G08B 25/08 |
| 2016/0301581 A1 | 10/2016 | Carter | |
| 2016/0309122 A1 * | 10/2016 | Kingery | G06K 9/00892 |
| 2016/0354014 A1 * | 12/2016 | Lobner | A61B 5/6828 |
| 2017/0134249 A1 | 5/2017 | Laing | |
| 2017/0162031 A1 * | 6/2017 | Drolshagen | G06K 9/00892 |
| 2017/0178483 A1 * | 6/2017 | Shapiro | G08B 21/0288 |
| 2017/0224517 A1 | 8/2017 | Doyle et al. | |
| 2017/0287311 A1 * | 10/2017 | Suryan | A45C 13/24 |
| 2017/0303090 A1 * | 10/2017 | Stitt | H04W 4/40 |
| 2017/0307388 A1 | 10/2017 | McConathy | |
| 2017/0374551 A1 * | 12/2017 | Shen | H04L 29/06 |
| 2018/0018864 A1 * | 1/2018 | Baker | G08B 21/043 |
| 2018/0124565 A1 * | 5/2018 | Villani | G08B 21/0283 |
| 2018/0158304 A1 * | 6/2018 | Hodge | G08B 21/22 |
| 2018/0184240 A1 * | 6/2018 | Yang | G06Q 30/0629 |
| 2018/0275859 A1 * | 9/2018 | Hodge | G06F 3/0481 |
| 2018/0288226 A1 * | 10/2018 | Collins | H04M 3/5232 |
| 2018/0308342 A1 * | 10/2018 | Hodge | G08B 21/0211 |
| 2019/0043285 A1 | 2/2019 | Hodge | |

* cited by examiner

SYSTEMS AND METHODS FOR MONITORED INDIVIDUAL VIOLATION INSTRUCTION

CROSS REFERENCE TO RELATED APPLICATION

The present application claims priority to (i.e., is a non-provisional of) U.S. Pat. App. No. 62/612,650 entitled "Systems and Methods for Monitoring Individuals", and filed Jan. 1, 2018 by Buck et al. The entirety of the aforementioned application is incorporated herein by reference for all purposes.

BACKGROUND OF THE INVENTION

Various embodiments provide systems and method for maintaining a restriction zone data set in relation to monitoring individuals where the maintenance involves both a user attached monitor device and a user detached monitor.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward.

Thus, there exists a need in the art for more advanced approaches, devices and systems for monitoring.

BRIEF SUMMARY OF THE INVENTION

Various embodiments provide systems and method for maintaining a restriction zone data set in relation to monitoring individuals where the maintenance involves both a user attached monitor device and a user detached monitor.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
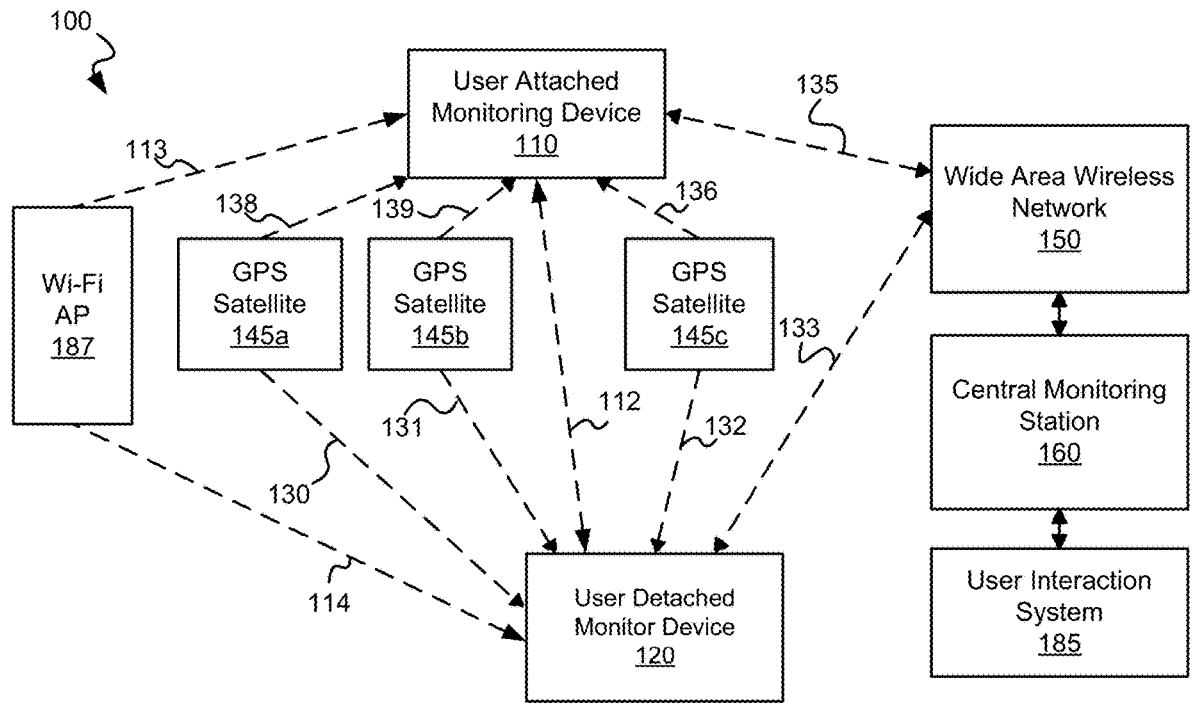
FIG. 1a is a block diagram illustrating a hybrid monitoring system including both a user attached monitor device and a user detached monitor device in accordance with various embodiments.

Various embodiments provide systems and method for maintaining a restriction zone data set in relation to monitoring individuals where the maintenance involves both a user attached monitor device and a user detached monitor.

It has been found that returning offenders to society after being locked up in a secure facility with little if any control of their day to day activities is often unsuccessful. It is often helpful to have, for example, a parole officer monitor their movements and activities for a period of time as they reenter society. In some cases, the parole officer is aided by a tracking device attached to the individual being monitored. However, this is costly as a parole officer must be significantly involved in monitoring and responding to situations. Some embodiments disclosed herein reduce the interaction between the tracking device and the parole officer.

Further, it has been found that once a monitoring term has been completed and a monitored individual has been fully released into society without oversight, the chances that the individual will re-engage in problematic behavior is high. Various embodiments disclosed herein provides tools and devices that continue to support the individual as they transition away from the active oversight by, for example, a parole officer.

Various embodiments provide monitoring systems that include a user attached monitor device and a user detached monitor device. The user attached monitor device includes: an attachment element configured to attach to a limb of an individual being monitored; and alert circuitry configured to sense a violation and to communicate an alert corresponding to the violation to a central monitoring station. The user detached monitor device included: a display; and a computer readable medium. The computer readable medium includes instructions executable by a processor to: receive a context of the alert; format the context of the alert for the display; and display the formatted context of the alert via the display.

In some instances of the aforementioned embodiments, the violation is a violation of an exclusion zone, the computer readable medium is a first computer readable medium, and the processor is a first processor. In such instances, the user attached monitor device further includes: location determination circuitry operable to determine a location of the user attached monitor device; and a second computer readable medium including instructions executable by a second processor to determine the violation of the exclusion zone based at least in part on the location of the user attached monitor device. In some cases, the context of the alert includes the location of the user attached monitor device.

In various instances of the aforementioned embodiments, the violation is a tamper with the attachment element. In such instances, the user attached monitor device further includes tamper detection determination circuitry operable to detect a tamper with the attachment element. In some instances, the attachment element is a strap where each end of the strap is connected to a respective end of the user attached monitor device, and the tamper determination circuitry is operable to detect a loss of continuity between the respective ends of the user attached monitor device. In various such instances, the context of the alert includes an indication of the tamper.

In one or more instances of the aforementioned embodiments, the user attached monitor device further includes a first local communication circuit where the user detached monitor device further includes a second local communication circuit. The context of the alert is received from the user attached monitor device via a local communication link supported by the first local communication circuit and the second local communication circuit. In various instances of the aforementioned embodiments, the context of the alert is received from the central monitoring station via a wireless wide area network. In some instances of the aforementioned embodiments, the computer readable medium further includes instructions executable by the processor to display guidance to resolve the violation corresponding to the context of the alert. In some such instances, the guidance is received from a source selected from a group consisting of: the user attached monitor device, the central monitoring station, and instructions executable by the processor of the user detached monitor device.

In various instances of the aforementioned embodiments, the computer readable medium further includes instructions executable by the processor to open a communication port based at least in part on the alert. In some such instances, the communication port is one or a combination of: a voice call, a video call, a real time messenger, a text message, and/or an email.

Other embodiments provide methods for monitoring an individual. The methods include: receiving a data set via a wireless wide area network communication circuit included in a user detached monitor device, where the user detached monitor device is associated with an individual being monitored; and transmitting a subset of the data set from the user detached monitor device to a user attached monitor device via a first local communication circuit included in the user attached monitor device and a second local communication circuit included in the user detached monitor device. The user attached monitor device is attached to a limb of the individual being monitored using an attachment element. When an attempt to remove the user attached monitor device from the limb of the individual being monitored is detected, the user attached monitor device communicates a tamper violation.

In some instances of the aforementioned embodiments, the data set includes instructions for operating the user attached monitor device. In various instances of the aforementioned embodiments, the data set is received from a central monitoring station. In one or more instances of the aforementioned embodiments, the tamper violation is communicated to the central monitoring station via a wireless wide area network. In some instances of the aforementioned embodiments, the data set is a first data set, the wireless wide area network circuit is a first wireless wide area network circuit, and the methods further include: receiving a second data set via a second wireless wide area network communication circuit included in a user attached monitor device; and transmitting a subset of the second data set from the user attached monitor device to the user detached monitor device via the first local communication circuit included in the user attached monitor device and a second local communication circuit included in the user detached monitor device.

Yet other embodiments provide methods for monitoring an individual. The methods include: using an attachment element to secure a user attachment device around the limb of the individual; receiving an alert from the user attached monitor device indicating a violation by the individual; and sending a context of the alert to a user detached monitor device associated with the individual. The user detached monitor device includes: a display, and a computer readable medium. The computer readable medium includes instructions executable by a processor to: receive the context of the alert; format the context of the alert for the display; and display the formatted context of the alert via the display.

Turning to FIG. 1a, a block diagram illustrates a hybrid monitoring system 100 including both a user attached monitor device 110 and a user detached monitor device 120 in accordance with various embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a BlueTooth™ communication link. In other examples, local communication link 112 may be a line of sight infrared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145a, 145b, 145c via respective communication links 130, 131, 132. The aforementioned location data is utilized verify the location of a user associated with user detached monitor device 120 at various points as more fully discussed below. User detached monitor device 120 is considered "ambiguous" because it is not attached to the user in a tamper resistant/evident way, but rather is freely severable from the user and thus could be used by persons other than the target. Various processes discussed herein mitigate the aforementioned ambiguity to yield a reasonable belief that information derived from user detached monitor device 120 corresponds to the target.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit— which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 114.

Central monitoring station 160 preferably comprises a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the user in accordance with the described embodiments. In particular, the interactive web portals may enable the monitor to retrieve the location and user identification data of one or more users, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website accessible via a software application on a mobile device (e.g. smart phone). The mobile website may be a modified version of the server supported website with limited or additional capabilities suited for mobile location monitoring.

User attached monitor device 110 includes a location sensor that senses the location of the device and generates a location data. The location data may comprise one or more of: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS satellites 145a, 145b, 145c via respective communication links 136, 138, 139. The aforementioned location data is utilized to verify the location of a user associated with user attached monitor device 110 at various points as more fully discussed below. User attached monitor device 110 is considered "non-ambiguous" because it is physically attached to the user in a tamper resistant way and as such provides information only about the user to which it is attached.

The location data and/or other data gathered by user attached monitor device 110 is wirelessly transmitted to central monitoring station 160 via a wide area wireless network 150 accessed via a wireless link 135. Central monitoring station 160 may be any location, device or system where the location data is received, including by way of non-limiting example: a cellular/smart phone, an email account, a website, a network database, and a memory device. The location data is stored by central monitoring station 160 and is retrievable therefrom by a monitor, such as a parent, guardian, parole officer, court liaison, spouse, friend, or other authorized group or individual. In this manner, monitor is able to respond appropriately to the detected out-of-bounds activity by a user.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware based instructions) executable by the control unit to perform and/or enable various functions associated with user attached monitor device 110. User attached monitor device may include a strap which can be wrapped around a limb of the individual being monitored to secure user attached monitor device to the individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and US Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Figure 1B:
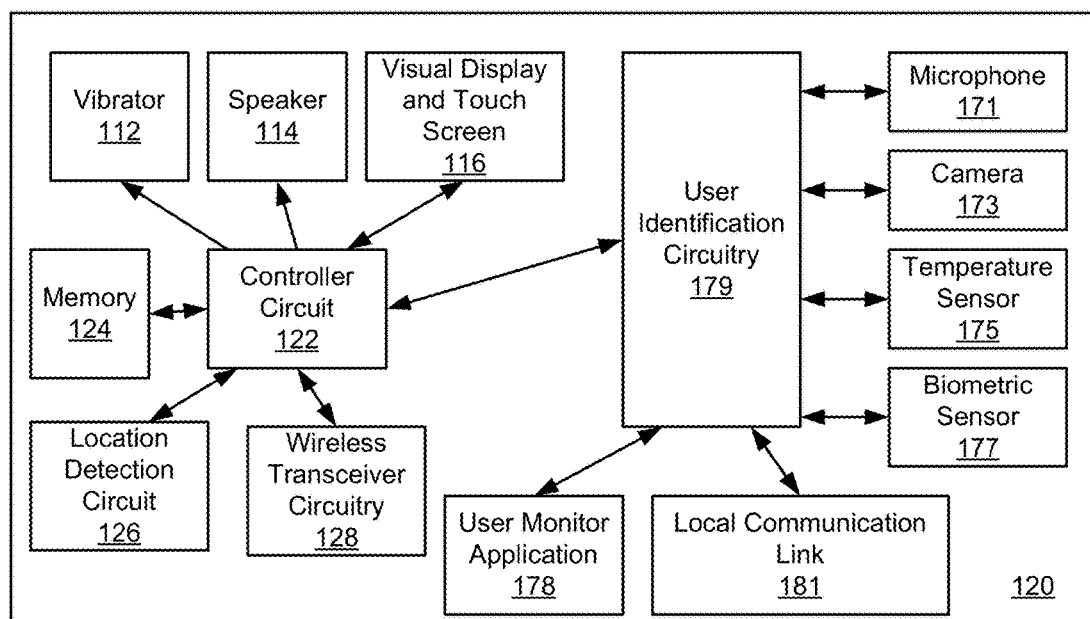
FIG. 1b is a block diagram of a user detached monitor device usable in accordance with one or more embodiments.

Turning to FIG. 1b, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a user of user detached monitor device 120 is alerted of a need to check-in. The schedule of check-in times may be downloaded to a memory 124 by central monitoring station 160 via wireless link 133. The user may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a control circuit 122 for controlling the operations thereof. In some cases, control circuit 122 includes a processor. In various cases, control circuit 122 is part of an integrated circuit. In one or more cases, memory 124 is included in an integrated circuit with control circuit 122. In various cases, memory 124 may include non-transient instructions (e.g., software of firmware based instructions) executable by controller circuit 122 to perform and/or enable various functions associated with user detached monitor device 120. A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the user involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the user.

User detached monitor device 120 further includes user identification circuitry 179 capable of gathering user identification information from one or more of a microphone 171, a camera 173, a temperature sensor 175, and/or a biometric sensor 177. In some cases, user identification circuitry 179 is incorporated in an integrated circuit with control circuit 122. Microphone 171 is capable of accurately capturing the sound of a user's voice, camera 173 is capable of accurately capturing images including, for example, an image of the user's face, temperature sensor 175 is capable of accurately capturing an ambient temperature around user detached monitor device 120, and biometric sensor 177 is capable of accurately capturing biometric data about the user including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, a camera 173, a temperature sensor 175, and/or a biometric sensor 177 into a user identification package which is forwarded to central monitoring station 160 via wireless transceiver circuitry 128.

User detached monitor device 120 additionally includes location circuitry 126. Location circuitry 126 may include one or more of, a GPS processing circuit capable of fixing a location of user detached monitor device 120 using GPS data, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a BlueTooth™ communication protocol and is capable of both receiving information from user attached monitor device 110 and transmitting information to user attached monitor device 110. In other embodiments, Local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

Figure 1C:
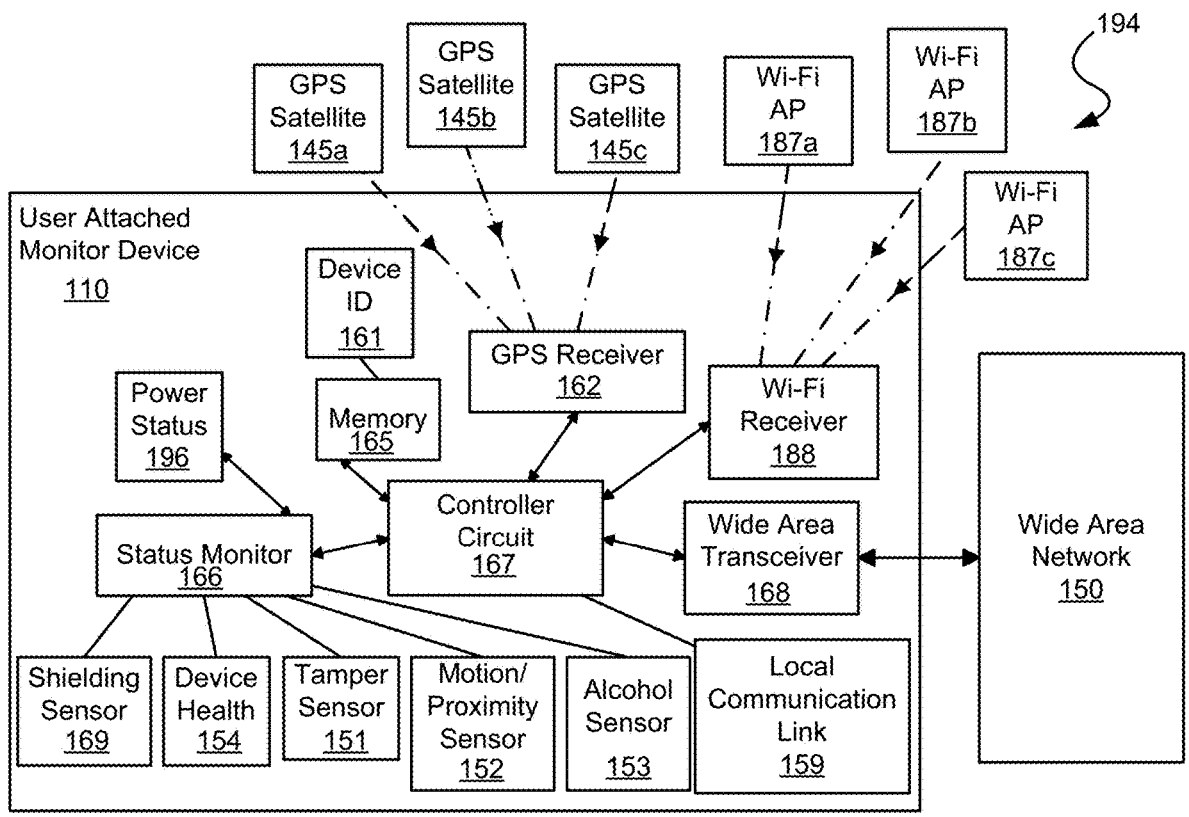
FIG. 1c is a block diagram of a user attached monitor device including a local communication link in accordance with some embodiments.

Turning to FIG. 1c, a block diagram 194 of user attached monitor device 110 including a local communication link 159 in accordance with some embodiments. Local communication link 159 controls communication between user attached monitor device 110 and user detached monitor device 120. In some embodiments, local communication link 159 supports a BlueTooth™ communication protocol and is capable of both receiving information from user detached monitor device 120 and transmitting information to user detached monitor device 120. In other embodiments, local communication link 159 supports a Wi-Fi communication protocol and is capable of both receiving information from user detached monitor device 110 and transmitting information to user detached monitor device 110. In some cases, local communication link 159 supports communication in only a receive or transmit direction. Based upon the disclosure provided herein, one of ordinary skill in the art will recognize a variety of communication protocols and information transfer directions that may be supported by local communication link 159 in accordance with different embodiments.

As shown, user attached monitor device 110 includes a device ID 161 that may be maintained in a memory 165, and thus is accessible by a controller circuit 167. Controller circuit 167 is able to interact with a GPS receiver 162 and memory 165 at times for storing and generating records of successively determined GPS locations. Similarly, controller circuit 167 is able to interact with a Wi-Fi receiver 188 and memory 165 at times for storing and generating records of successively determined Wi-Fi access point identifications and signal strength. In some cases, memory 165 may include non-transient instructions (e.g., software of firmware based instructions) executable by controller circuit 167 to perform and/or enable various functions associated with user attached monitor device 110. As user attached monitor device 110 comes within range of one or more Wi-Fi access points (e.g., Wi-Fi access points 187), Wi-Fi receiver 188 senses the signal provided by the respective Wi-Fi access points, and provides an identification of the respective Wi-Fi access point and a signal strength of the signal received from the Wi-Fi access point to Wi-Fi receiver 188. This information is provided to controller circuit 167 which stores the information to memory 165.

Where user attached monitor device 110 is operating in a standard mode, controller circuit 167 causes an update and reporting of the location of user attached monitor device 110 via a cellular transceiver 168 and a wide area communication network 150 in accordance with a first time period. In contrast, where user attached monitor device 110 is within range of a public Wi-Fi access point, reporting the location of user attached monitor device 110 may be done via the public Wi-Fi access point in place of the cellular communication link. In another case where user attached monitor device 110 is operating in a low battery mode, reporting the location of user attached monitor device 110 may be done via user detached monitoring device 120 coupled using local communication link 159.

Which technologies are used to update the location of user attached monitor device 110 may be selected either by default, by programming from a central monitor system (not shown), or based upon scenarios. For example, it may be determined whether sufficient battery power as reported by power status 196 remains in user attached monitor device 110 to support a particular position determination technology. Where insufficient power remains, the particular technology is disabled. In some cases, a maximum cost of resolving location may be set for user attached monitor device 110. For example, resolving Wi-Fi location data may incur a per transaction cost to have a third party service provider resolve the location information. When a maximum number of resolution requests have been issued, the Wi-Fi position determination technology may be disabled. Further, it may be determined the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, the Wi-Fi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon which zone a tracking device is located. Some zones may be rich in Wi-Fi access points and in such zones Wi-Fi technology may be used. Otherwise, another technology such as cell tower triangulation or GPS may be used.

Controller circuit 167 of user attached monitor device 110 at times functions in conjunction with cellular transceiver 168 to send and receive data and signals through wide area communication network 150. This link at times is useful for passing information and/or control signals between a central monitoring system (not shown) and user attached monitor device 110. The information transmitted may include, but is not limited to, location information, alcohol information, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user detached monitor device 120, and of the individual associated therewith. For example, a status monitor 166 may include one or more of the following subcomponents: power status sensor 196 capable of indicating a power status of user detached monitor device 120. The power status may be expressed, for example as a percentage of battery life remaining. Based upon the disclosure provided herein, one of ordinary skill in the art will recognize a variety of forms in which power status may be expressed. In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 131 capable of determining whether unauthorized access to user attached monitor device 110 has occurred or whether user attached monitor device 110 has been removed from an associated individual being monitored, a motion/proximity sensor 152 capable of determining whether user attached monitor device 110 is moving and/or whether it is within proximity of an individual associated with user detached monitor device 120, and/or an alcohol sensor 153. Such an alcohol sensor may be any alcohol sensor capable of estimating an amount of alcohol in the individual being monitored. Based upon the disclosure provided herein, one of ordinary skill in the art will recognize a variety of alcohol sensors and corresponding alcohol sensing circuitry that may be used in relation to different embodiments. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

Figure 1D:
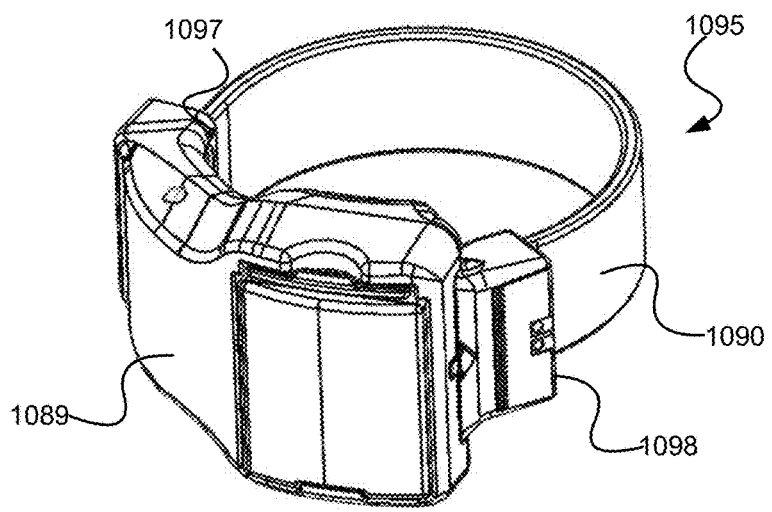
FIG. 1d shows a user attached monitor device with an attachment element for attaching the user attached monitor device to a limb of an individual in accordance with some embodiments.

Turning to FIG. 1*d*, a user attached monitor device 1095 is shown with an attachment element 1090 connected at opposite ends of user attached monitor device 1089 (i.e., a first end 1097 and a second end 1098). Attachment element 1090 is operable to securely attach a tracking device 1095 (i.e., a combination of user attached monitor device 1089 and attachment element 1090) to a limb of an individual in accordance with some embodiments.

Figure 2:
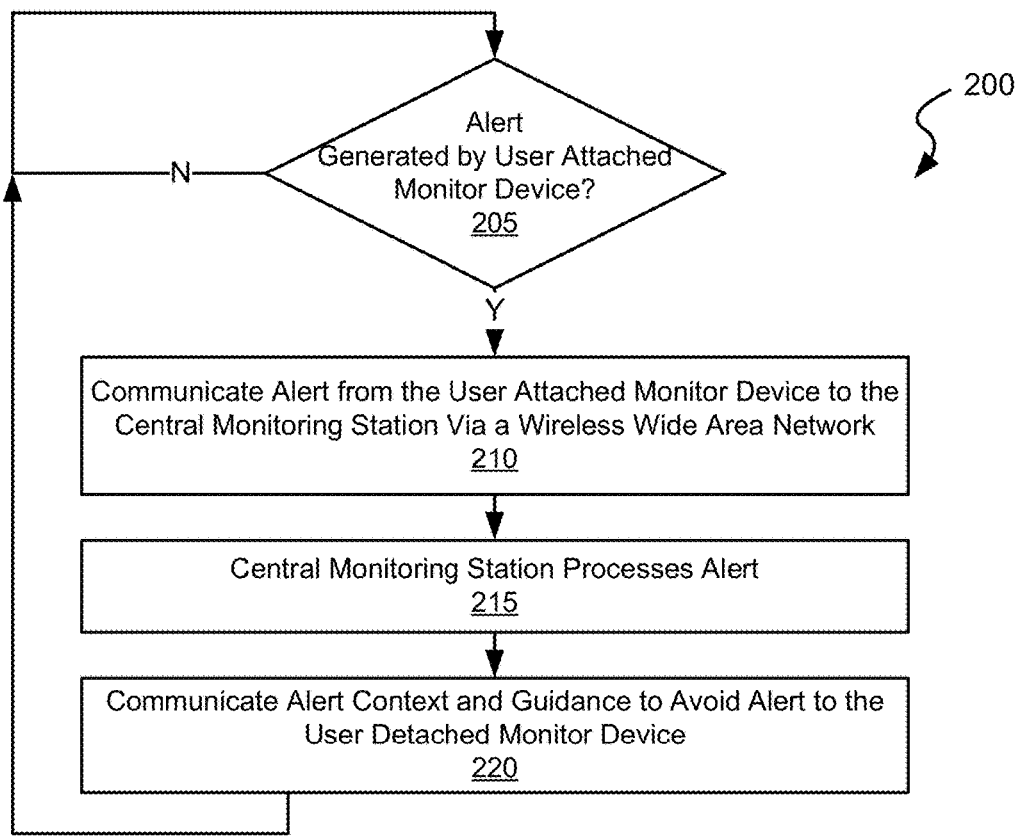
FIG. 2 is a flow diagram showing a method for providing guidance and instruction to a monitored individual via a user detached monitor device regarding an alert generated via the user attached monitor device in accordance with one or more embodiments.

Turning to FIG. 2, a flow diagram 200 shows a method for providing guidance and instruction to a monitored individual via a user detached monitor device regarding an alert generated via the user attached monitor device in accordance with one or more embodiments. Following flow diagram 200, it is determined whether an alert has been issued by the user attached monitor device (block 205). This alert may be, but is not limited to, an indication that one or more of the tamper sensors (e.g., shielding sensor 169, or tamper sensor 151), that the user attached monitor device as moved into an exclusion zone, or another alert that the user attached monitor device is designed to detect and generate. As used herein, an "exclusion zone" is any area or location where an individual associated with the user detached monitor device and/or the user attached monitor device is prohibited and/or discouraged from entering. The exclusion zones may be identified in a number of ways. For example, the exclusion zones may be identified as two opposing corners of a rectangle or a center point and radius of a circle. Based upon the disclosure provided herein, one of ordinary skill in the art recognize other approaches that may be used for identifying the boundaries of a exclusion zone. The universe of exclusion zones may be developed, for example, by local area officials to identify the location of different types of zones in a region that they operate. In turn, zone information from a number of local regions may be assembled in a common database to make a wider area map of zones. Exclusion zones may each be identified for different reasons, and may be grouped together with other exclusion zones that share similar characteristics. For example, places where children are present like parks and schools, places where alcohol is prevalent such as bars or night clubs, or the like. Individuals may be precluded from entering one or more types of exclusion zones.

Where the user attached monitor device has generated an alert (block 205), the alert is communicated from the user attached monitor device to a central monitoring station via a wireless wide area network (block 210). The central monitoring station processes the received alert (block 215). Such processing may include, but is not limited to: logging the alert into a relational database such that the alert is time stamped and associated with the individual being monitored using the user attached monitor device; and/or forwarding the alert to an officer responsible for the individual being monitored. Based upon the disclosure provided herein, one of ordinary skill in the art will recognize a variety of processing that may be applied at the central monitoring station to an alert received from the user attached monitor device.

An alert context and guidance to avoid the alert is communicated to the user detached monitor device associated with the individual being monitored (block 220). This communication may be from the central monitoring station via a wireless wide area network. Based upon the disclosure provided herein, one of ordinary skill in the art will recognize other communication networks that may be used for the communication, and/or other sources of the communication that may be used in relation to different embodiments.

The alert context and guidance is designed to educate the individual being monitored on why an alert was generated, to provide instructions on how to resolve the current alert, and/or to provide instructions on how to avoid generating the alert in the future. For example, where the alert is a tamper alert, the alert context provided to the individual being monitored may be a list of status of the user attached monitor device, and the instructions on how to resolve the current alert may include an instruction to call the officer in charge to both receive further instructions on how to resolve the alert and to explain the activity the individual being monitored engaged in that triggered the alert and why the individual being monitored was engaged in such activity. Alternatively, where for example the alert is an exclusion zone violation, the alert context may show the location of the individual being monitored on a map graphic that also shows the boundaries of the exclusion zone, the instructions on how to resolve the current alert may include step by step instructions for a path that is to be taken to move out of the exclusion zone, and the instructions on how to avoid generating the alert in the future may request origin and destination information from the individual being monitored followed by directions for a path that can be used in the future which would not generate an alert.

Figure 3:
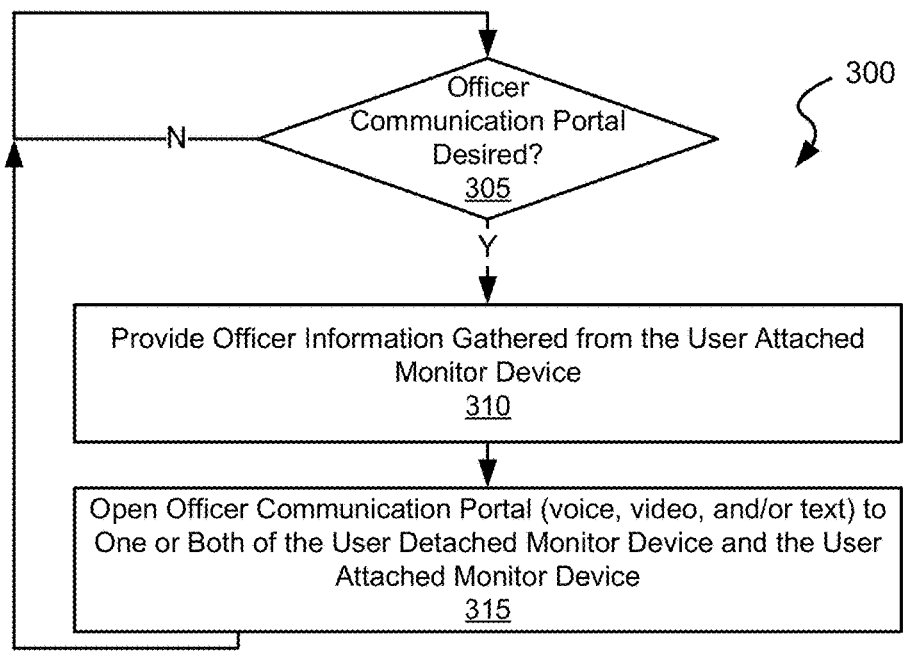
FIG. 3 is a flow diagram showing a method for opening an officer communication portal between an officer and a user detached monitor device upon gathering information about a monitored individual using a user attached monitor device in accordance with some embodiments.

Turning to FIG. 3, a flow diagram 300 shows a method for opening an officer communication portal between an officer and a user detached monitor device upon gathering information about a monitored individual using a user attached monitor device. Following flow diagram 300, it is determined whether an officer communication portal desired (block 305). An officer communication portal may be required, for example, where an officer selects a setting in the central monitoring station that indicates an officer communication portal is to be opened whenever a certain type of alert is generated by the user attached monitor device. Thus, for example, anytime an individual being monitored ventures into an exclusion zone surrounding a school or park where children are likely present, the setting may indicate that an officer communication portal is to be opened.

In some cases, the setting that an officer communication portal is to be opened when a certain type of alert is issued by the user attached monitor device is compounded with an acceptance of an officer communication portal by the officer. In such a case where the setting indicates an officer communication portal is to be opened and an alert is received from the user attached monitor device, a communication is sent from the central monitoring station to the officer via email, text, or voice call asking whether the officer desires the communication portal to be opened. Based upon the disclosure provided herein, one of ordinary skill in the art will recognize a variety of ways that the information can be sent and/or received between the central monitoring station and the officer. If the officer either does not respond or responds that no portal is desired, then it is determined that an officer communication portal is not desired (block 305). Otherwise, if the officer responds that a communication portal is desired, then it has been determined that an officer communication portal is desired (block 305).

Where it is determined that an officer communication portal is desired (block 305), the officer is provided with the information gathered from the user attached monitor device including, but not limited to, the information that triggered the alert (block 310). This information is sent to the officer from the central monitoring station via email, text, or a voice call. Again, based upon the disclosure provided herein, one of ordinary skill in the art will recognize a variety of ways that the information can be sent and/or received between the central monitoring station and the officer.

An officer communication portal is then opened between the officer and one or both of the user detached monitor device associated with the individual being monitored and/or the user attached monitor device attached to the individual being monitored (block 315). Opening the officer communication portal may include, but is not limited to, connecting a communication device used by the officer with the user detached monitor device. This can be done, for example, by causing the communication device used by the officer to initiate communications with the user detached monitor device by, for example, dialing the user detached monitor device, or sending a prepared text message from the communication device used by the officer to the user detached monitor device. Where the communication is initiated by dialing the user detached monitor device, the resulting connection where the individual being monitored answers the incoming call from via the user detached monitor device may be, but is not limited to, a video call, a voice call, and/or a real time messaging link. Based upon the disclosure provided herein one of ordinary skill in the art will recognize a variety of mechanisms for opening an officer communication portal and/or types of communications between the officer and the individual being monitored that can be supported via the officer communication portal.

Figure 4:
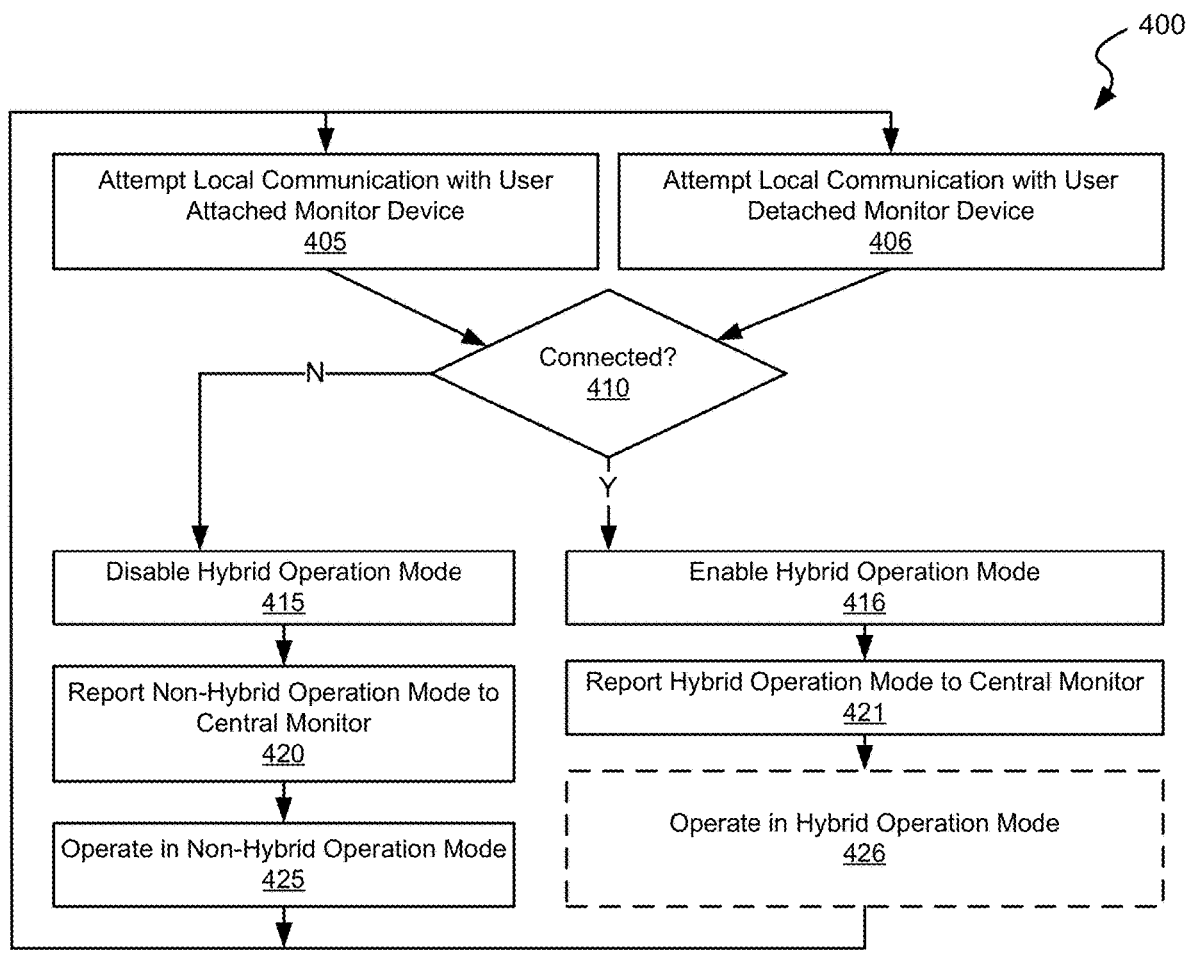
FIG. 4 is a flow diagram showing a method for connecting a user detached monitoring device and a user attached monitoring device using a local communication link, and for changing a mode of operation of a monitoring system based upon the connection in accordance with various embodiments.

Turning to FIG. 4, a flow diagram 400 shows a method for connecting a user detached monitoring device and a user attached monitoring device using a local communication link, and for changing a mode of operation of a monitoring system based upon the connection in accordance with various embodiments. The mode of operation is changed between a non-hybrid operation mode where monitoring is performed exclusively by only one of the user detached monitor device or the user attached monitor device. In certain embodiments, when a connection between a user attached monitor device and a user detached monitor device is not possible, monitoring of an individual is performed exclusively by the user attached monitor device.

Following flow diagram 400, local communication is attempted by the user detached monitor device to the user attached monitor device (block 405). The communication attempt can be sent by one or both of the user attached monitoring device and/or the user detached monitoring device. In some cases, the communication is always attempted by the user detached monitor device to the user attached monitor device (block 405). In such cases, the aforementioned local communication link 181 of the user detached monitor device is used to send a connection request to local communication link 159 of the user attached monitor device. Where the request is accepted by the user attached monitor device, the devices are connected. In some cases, the connection request is a BlueTooth™ communication protocol request. In other cases, the connection request is a Wi-Fi communication protocol request. Based upon the disclosure provided herein, one of ordinary skill in the art will recognize a variety of communication protocol requests that may be used in relation to different embodiments.

In other cases, the communication is always attempted by the user attached monitoring device to the user detached monitor device (block 406). In such cases, the aforementioned local communication link 159 of the user attached monitor device is used to send a connection request to the attached monitor communication circuit 181 of the user detached monitor device. Where the request is accepted by the user detached monitor device, the devices are connected. In certain cases, the communication is attempted by both the user attached monitoring device to the user detached monitor device, and the user detached monitoring device to the user attached monitor device in parallel (block 406). Where either the connection request from the user detached monitor device to the user attached monitor device or the connection request from the user attached monitor device to the user detached monitor device is accepted by the recipient device, the user attached monitor device and the user detached monitor device are considered connected (block 410).

Where the user detached monitor device and the user attached monitor device are considered attached (block 410), hybrid mode operation is enabled (block 416) and the hybrid mode of operation is reported to the central monitor by one or both of the user detached monitor device and/or the user attached monitor device (block 421). Hybrid mode operation allows for use of functionality from a combination of the user attached monitor device and the user detached monitor device (block 426). Such operation in the hybrid mode is shown in dashed lines as there are a large number of combinations of the functionality of the user detached monitor device and the user attached monitor device that may be used in relation to different embodiments. For example, as discussed in more detail below in relation to FIG. 3, where it is determined that the battery in the user attached monitor device is identified the cellular transmitter in the user attached monitor device may be shut down and all cellular communications handled via the user detached monitor device. This may be done, for example, by transferring reporting data from the user attached monitor device to the user detached monitor device (using a combination of local communication link 159 and local communication link 181), and the information transferred to the user detached monitor device is uploaded to a central monitor using the cellular transceiver of the user detached monitor device. Based upon the disclosure provided herein, one of ordinary skill in the art will recognize a variety of combinations of the functionality of the user detached monitor device and the user attached monitor device that may be used in relation to different embodiments.

Alternatively, where the user detached monitor device and the user attached monitor device are not considered attached (block 410), the hybrid mode of operation is disabled (block 415) and the non-hybrid mode of operation is reported to the central monitor by one or the other of the user detached monitor device or the user attached monitor device that attempted to connect to the other but failed to establish a connection (block 420). Non-hybrid mode operation causes both the user attached monitor device and the user detached monitor device to operate as if they are the only monitoring device in operation (block 425).

Figure 5:
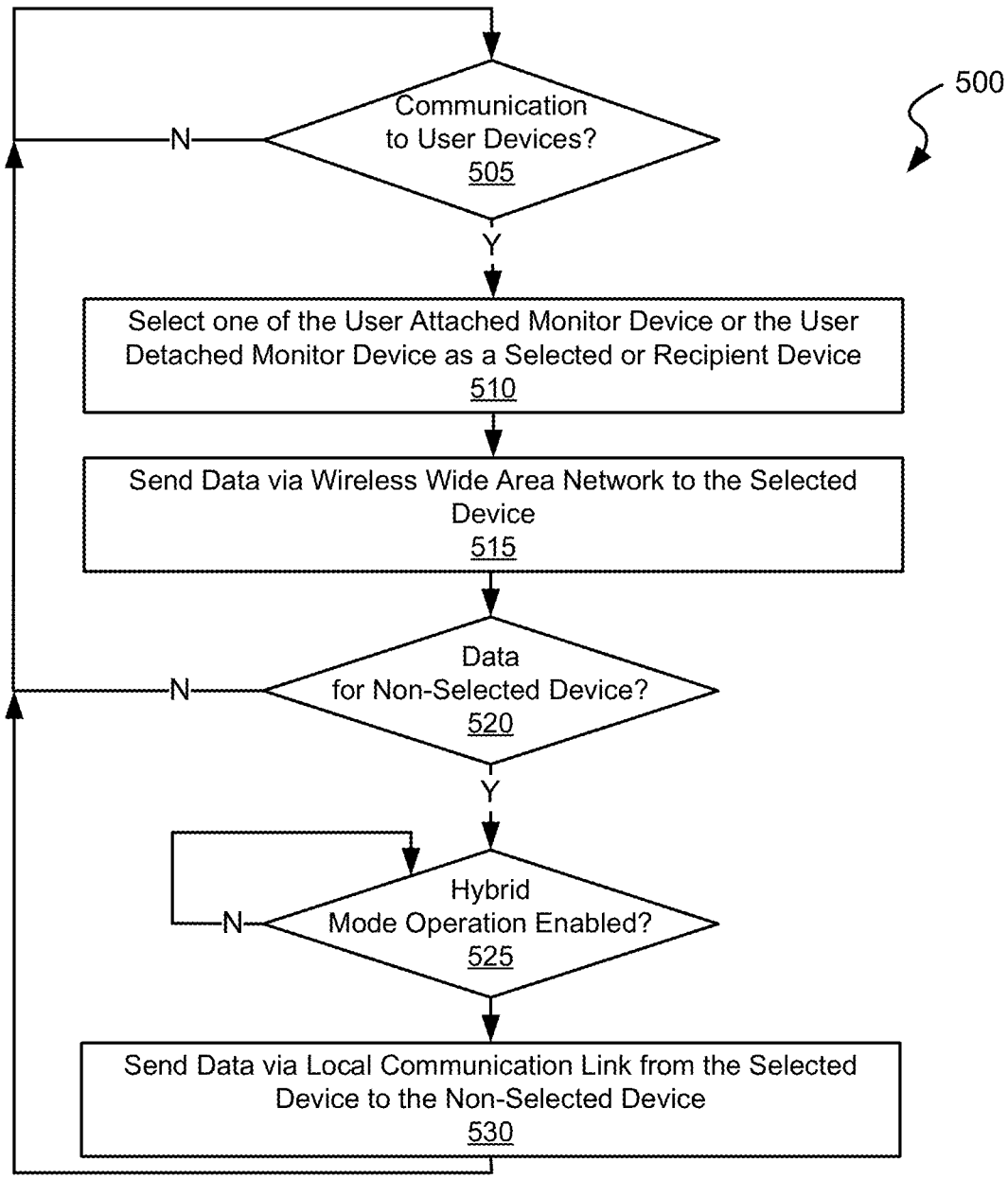
FIG. 5 is a flow diagram showing a method for communicating with a selected one or both of a user detached monitor device and/or a user attached monitor device in accordance with various embodiments of the present inventions.

Turning to FIG. 5, a flow diagram 500 shows a method for communicating with a selected one or both of a user detached monitor device and/or a user attached monitor device in accordance with various embodiments. Following flow diagram 500, it is determined whether information is to be communicated from a central monitoring station to one of both of the user detached monitor device and/or the user attached monitor device (block 505). At times central monitor station uploads updates including, but not limited to, applications executable by one or both of the user detached monitor device and/or the user attached monitor device, updated exclusion zones, or updated check in requirements and/or schedules. Based upon the disclosure provided herein, one of ordinary skill in the art will recognize a variety of information that may be uploaded from a central monitor station to the user attached monitor device and/or the user detached monitor device.

Where information is to be communicated to one or both of the user detached monitor device or the user attached monitor device (block 505), one of the user detached monitor device or the user attached monitor device is selected as a recipient device (block 510). This selection may be made by the central monitoring station. In some cases, the selection is a default selection that is always chosen. In other cases, the selection may be based upon a dynamic criteria such as, for example, which of the two devices has the most charge. As another example, selection may be made based upon which of the devices is available to accept the transfer. Based upon the disclosure provided herein, one of ordinary skill in the art will recognize a variety of criteria that may be used to choose the selected device.

The data is then transferred from the central monitor station to the selected recipient device via a wireless wide area network (block 515). This may be done using any method for transferring data that is known in the art. It is determined by the recipient device whether any part of the received data is directed to the non-selected one of the user detached monitor device or the user detached monitor device (block 520). Where none of the data is directed to the other device, the transfer process is completed.

Otherwise, where it is determined that at least part of the received data is directed to the non-selected one of the user detached monitor device or the user detached monitor device (block 520), it is determined whether hybrid mode operation is enabled (block 525). The hybrid operational mode may be, for example, enabled/disabled using the method discussed above in relation to FIG. 4. Where hybrid mode is not enabled (block 525), no connection via a local communication link is available between the user attached monitor device and the user detached monitor device. Thus, no transfer between the selected device that holds and transferred information and the non-selected device is possible. The process awaits a time when the hybrid mode of operation is re-enabled to compete the transfer.

Alternatively, where the hybrid mode of operation is enabled (block 525), the portion of the data received by the selected device is sent to the non-selected device via a communication link (e.g., using local communication link 159 of the user detached monitor device and local communication link 181 of the user attached monitor device)(block 530).

Figure 6:
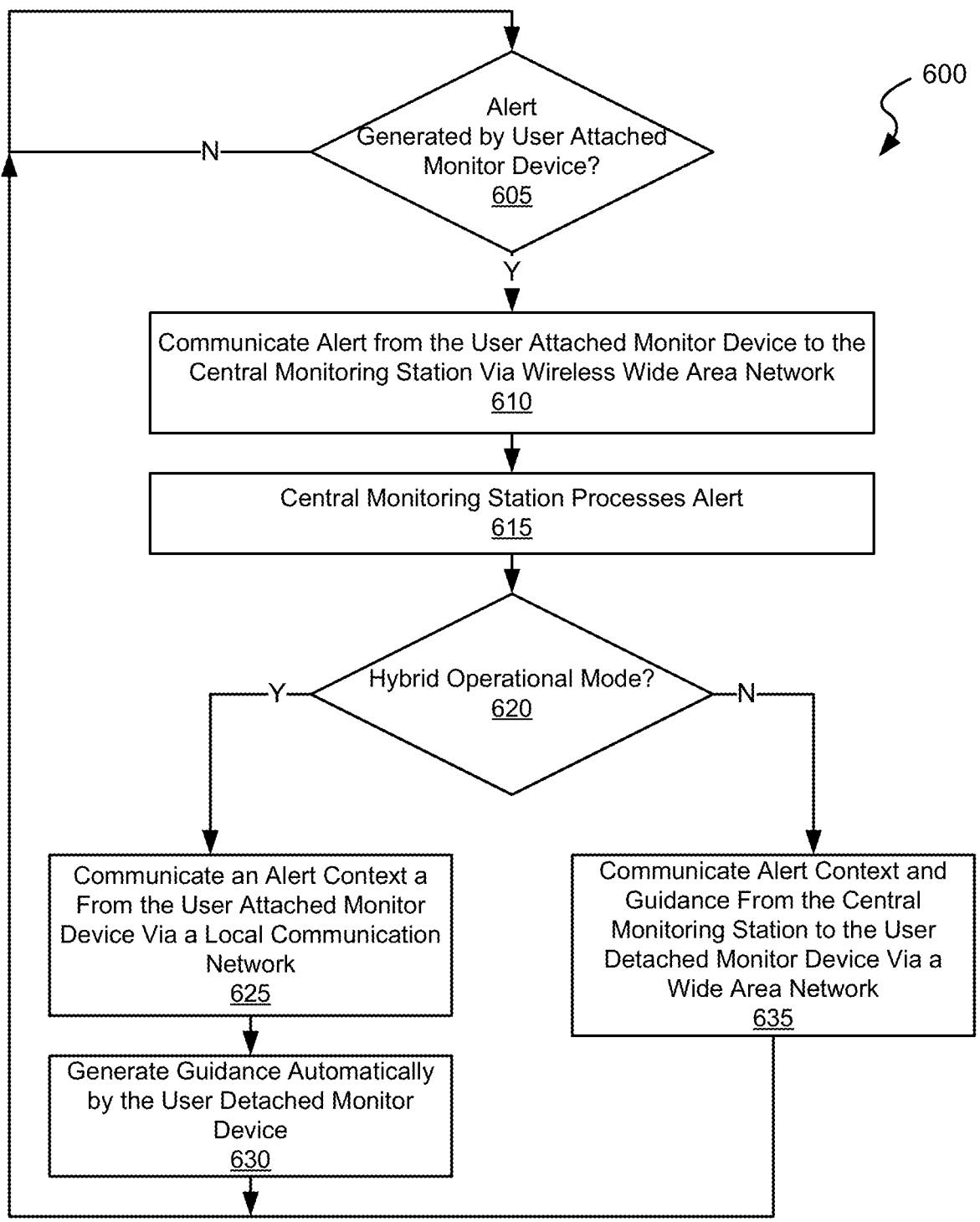
FIG. 6 is a flow diagram showing another method for providing guidance and instruction to a monitored individual via a user detached monitor device regarding an alert generated via the user attached monitor device that is based in part on whether hybrid mode operation is enabled in accordance with one or more embodiments.

Turning to FIG. 6, a flow diagram 600 shows another method for providing guidance and instruction to a monitored individual via a user detached monitor device regarding an alert generated via the user attached monitor device that is based in part on whether hybrid mode operation is enabled in accordance with one or more embodiments. Following flow diagram 600, it is determined whether an alert has been issued by the user attached monitor device (block 605). This alert may be, but is not limited to, an indication that one or more of the tamper sensors (e.g., shielding sensor 169, or tamper sensor 151), that the user attached monitor device as moved into an exclusion zone, or another alert that the user attached monitor device is designed to detect and generate.

Where the user attached monitor device has generated an alert (block 605), the alert is communicated from the user attached monitor device to a central monitoring station via a wireless wide area network (block 610). The central monitoring station processes the received alert (block 615). Such processing may include, but is not limited to: logging the alert into a relational database such that the alert is time stamped and associated with the individual being monitored using the user attached monitor device; and/or forwarding the alert to an officer responsible for the individual being monitored. Based upon the disclosure provided herein, one of ordinary skill in the art will recognize a variety of processing that may be applied at the central monitoring station to an alert received from the user attached monitor device.

It is determined whether hybrid operational mode is enabled (block 620). The hybrid operational mode may be, for example, enabled/disabled using the method discussed above in relation to FIG. 4. Where hybrid operational mode is enabled (block 620), an alert context is communicated to the user detached monitor device from the user attached monitor device (block 625). This communication is done using a local communication link supported by local communication link 159 of the user detached monitor device and local communication link 181 of the user attached monitor device. Guidance for how to eliminate the alert and/or how to avoid generating the alert in the future is provided automatically by the user detached monitor device (block 630).

The alert context along with the guidance is designed to educate the individual being monitored on why an alert was generated, to provide instructions on how to resolve the current alert, and/or to provide instructions on how to avoid generating the alert in the future. For example, where the alert is a tamper alert, the alert context provided to the individual being monitored may be a list of status of the user attached monitor device, and the instructions generated by the user detached monitor device on how to resolve the current alert may include an instruction to call the officer in charge to both receive further instructions on how to resolve the alert and to explain the activity the individual being monitored engaged in that triggered the alert and why the individual being monitored was engaged in such activity. Alternatively, where for example the alert is an exclusion zone violation, the alert context may indicate the location of the individual being monitored to the user detached monitor device that in turn displays the location on a map graphic that also shows the boundaries of the exclusion zone, the instructions on how to resolve the current alert may include step by step instructions for a path that is to be taken to move out of the exclusion zone, and the instructions on how to avoid generating the alert in the future may request origin and destination information from the individual being monitored followed by directions for a path that can be used in the future which would not generate an alert.

Alternatively, where hybrid operational mode is not enabled (block 620), an alert context and guidance to avoid the alert is communicated to the user detached monitor device associated with the individual being monitored from a central monitoring station (block 635). Again, the alert context and guidance is designed to educate the individual being monitored on why an alert was generated, to provide instructions on how to resolve the current alert, and/or to provide instructions on how to avoid generating the alert in the future. For example, where the alert is a tamper alert, the alert context provided to the individual being monitored may be a list of status of the user attached monitor device, and the instructions on how to resolve the current alert may include an instruction to call the officer in charge to both receive further instructions on how to resolve the alert and to explain the activity the individual being monitored engaged in that triggered the alert and why the individual being monitored was engaged in such activity. Alternatively, where for example the alert is an exclusion zone violation, the alert context may show the location of the individual being monitored on a map graphic that also shows the boundaries of the exclusion zone, the instructions on how to resolve the current alert may include step by step instructions for a path that is to be taken to move out of the exclusion zone, and the instructions on how to avoid generating the alert in the future may request origin and destination information from the individual being monitored followed by directions for a path that can be used in the future which would not generate an alert.

Figure 7:
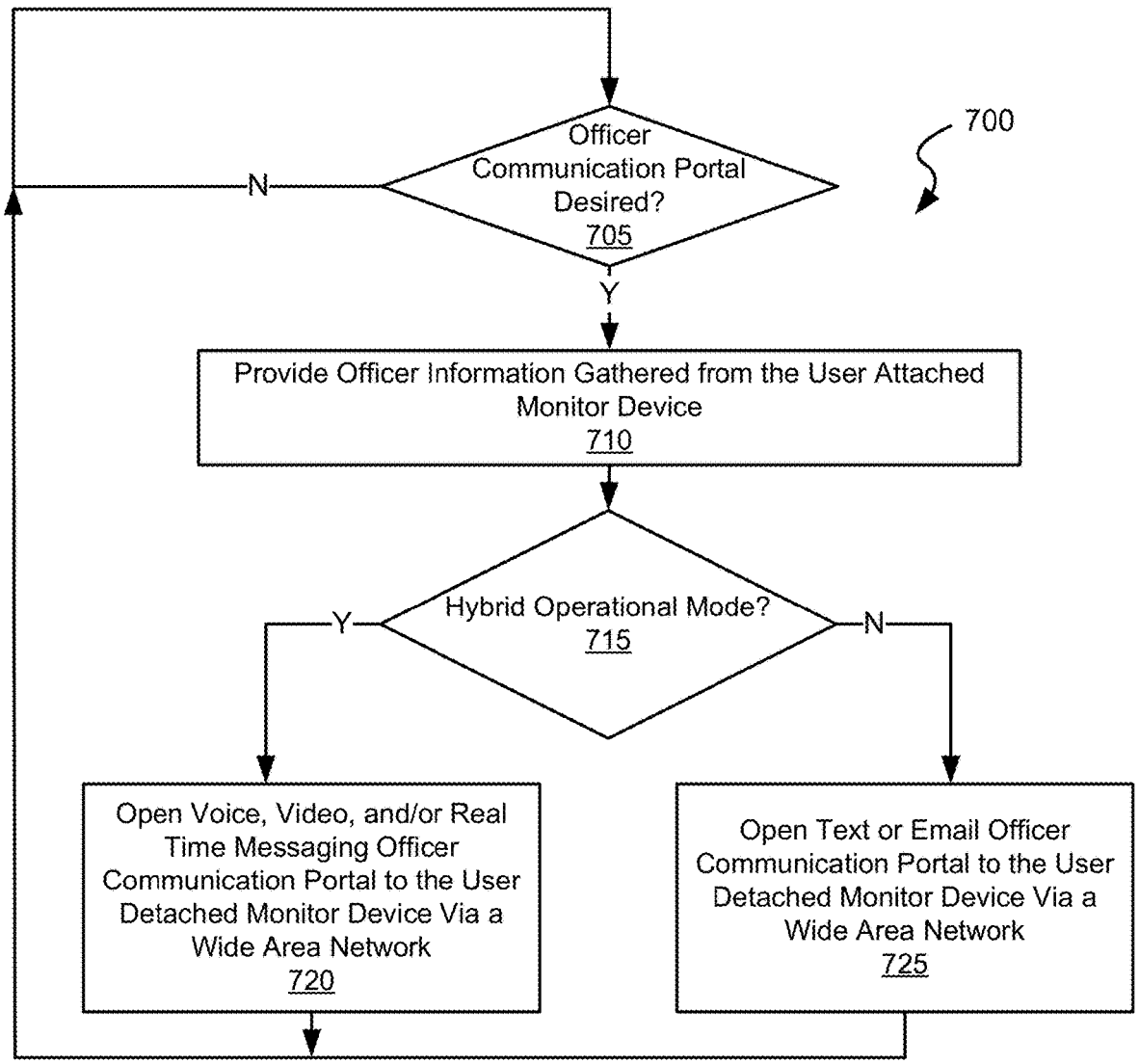
FIG. 7 is a flow diagram showing another method for opening an officer communication portal between an officer and a user detached monitor device upon gathering information about a monitored individual using a user attached monitor device that is based in part on whether hybrid mode operation is enabled in accordance with various embodiments.

FIG. 7 is a flow diagram showing another method for opening an officer communication portal between an officer and a user detached monitor device upon gathering information about a monitored individual using a user attached monitor device that is based in part on whether hybrid mode operation is enabled in accordance with various embodiments. Following flow diagram 700, it is determined whether an officer communication portal desired (block 705). An officer communication portal may be required, for example, where an officer selects a setting in the central monitoring station that indicates an officer communication portal is to be opened whenever a certain type of alert is generated by the user attached monitor device. Thus, for example, anytime an individual being monitored ventures into an exclusion zone surrounding a school or park where children are likely present, the setting may indicate that an officer communication portal is to be opened.

In some cases, the setting that an officer communication portal is to be opened when a certain type of alert is issued by the user attached monitor device is compounded with an acceptance of an officer communication portal by the officer. In such a case where the setting indicates an officer communication portal is to be opened and an alert is received from the user attached monitor device, a communication is sent from the central monitoring station to the officer via email, text, or voice call asking whether the officer desires the communication portal to be opened. Based upon the disclosure provided herein, one of ordinary skill in the art will recognize a variety of ways that the information can be sent and/or received between the central monitoring station and the officer. If the officer either does not respond or responds that no portal is desired, then it is determined that an officer communication portal is not desired (block 705). Otherwise, if the officer responds that a communication portal is desired, then it has been determined that an officer communication portal is desired (block 705).

Where it is determined that an officer communication portal is desired (block 705), the officer is provided with the information gathered from the user attached monitor device including, but not limited to, the information that triggered the alert (block 710). This information is sent to the officer from the central monitoring station via email, text, or a voice call. Again, based upon the disclosure provided herein, one of ordinary skill in the art will recognize a variety of ways that the information can be sent and/or received between the central monitoring station and the officer.

It is determined whether hybrid operational mode is enabled (block 715). The hybrid operational mode may be, for example, enabled/disabled using the method discussed above in relation to FIG. 4. Where hybrid operational mode is enabled (block 715), a real time officer communication portal is opened between the officer and the user detached monitor device (bock 720). The real time officer communication portal may be, but is not limited to, a voice call, a video call, and/or real time messenger. Based upon the disclosure provided herein, one of ordinary skill in the art will recognize other real time officer communication portals that may be opened in relation to different embodiments. Opening the real time officer communication portal may include, but is not limited to, connecting a communication device used by the officer with the user detached monitor device. This can be done, for example, by causing the communication device used by the officer to initiate communications with the user detached monitor device by, for example, dialing the user detached monitor device, or initiating a real time messaging application. Where the communication is initiated by dialing the user detached monitor device, the resulting connection where the individual being monitored answers the incoming call from via the user detached monitor device may be, but is not limited to, a video call, a voice call, and/or a real time messaging link. Based upon the disclosure provided herein one of ordinary skill in the art will recognize a variety of mechanisms for opening an officer communication portal and/or types of communications between the officer and the individual being monitored that can be supported via the officer communication portal.

Alternatively, where hybrid operational mode is not enabled (block 715), a non-real time is opened between the officer and the user detached monitor device (bock 725). The non-real time officer communication portal may be, but is not limited to, a text message or an email. Based upon the disclosure provided herein, one of ordinary skill in the art will recognize other non-real time officer communication portals that may be opened in relation to different embodiments. Opening the non-real time officer communication portal may include, but is not limited to, connecting a communication device used by the officer with the user detached monitor device. This can be done, for example, by causing the communication device used by the officer to initiate communications with the user detached monitor device by, for example, emailing or texting information to the user detached monitor device. Based upon the disclosure provided herein one of ordinary skill in the art will recognize a variety of mechanisms for opening an officer communication portal and/or types of communications between the officer and the individual being monitored that can be supported via the officer communication portal.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a user attached monitor device including:
   a location determination circuitry operable to determine a location of the user attached monitor device;
   an attachment element configured to attach to a limb of an individual being monitored;
   a wide area communication circuitry;
   a local communication circuitry operable to communicate with a user detached monitor device over a local communication link; and
   an alert circuitry configured to sense a violation and to communicate an alert corresponding to the violation to a central monitoring station via a wireless wide area network using the wide area communication circuitry;
   a location update circuitry operable to transmit the location of the user attached monitor device to the central monitoring station via the wireless wide area network using the wide area communication circuitry;
   the user detached monitor device including:
   a display; and
   a non-transitory computer readable medium including instructions executable by a processor to:
   receive a context of the alert;
   format the context of the alert for the display;
   display the formatted context of the alert via the display; and
   display guidance to resolve the violation corresponding to the context of the alert.

2. The monitoring system of claim 1, wherein the violation is a violation of an exclusion zone, wherein the non-transitory computer readable medium is a first non-transitory computer readable medium, wherein the processor is a first processor, and wherein the user attached monitor device further includes:
   a second non-transitory computer readable medium including instructions executable by a second processor to determine the violation of the exclusion zone based at least in part on the location of the user attached monitor device.

3. The monitoring system of claim 2, wherein the context of the alert includes the location of the user attached monitor device.

4. The monitoring system of claim 1, wherein the violation is a tamper with the attachment element, wherein the user attached monitor device further includes:
   a tamper detection determination circuitry operable to detect the tamper with the attachment element.

5. The monitoring system of claim 4, wherein the attachment element is a strap, wherein each end of the strap is connected to a respective end of the user attached monitor device, and wherein the tamper determination circuitry is operable to detect a loss of continuity between the respective ends of the user attached monitor device.

6. The monitoring system of claim 4, wherein the context of the alert includes an indication of the tamper.

7. The monitoring system of claim 1, wherein the local communication circuitry is a first local communication circuitry, and wherein the user detached monitor device further includes a second local communication circuitry, and wherein the context of the alert is received from the user attached monitor device via a local communication link supported by the first local communication circuitry and the second local communication circuitry.

8. The monitoring system of claim 1, wherein the context of the alert is received from the central monitoring station via the wireless wide area network.

9. The monitoring system of claim 1, wherein the guidance is received from a source selected from a group consisting of: the user attached monitor device, the central monitoring station, and instructions executable by the processor of the user detached monitor device.

10. The monitoring system of claim 1, wherein the non-transitory computer readable medium further includes instructions executable by the processor to open a communication port based at least in part on the alert.

11. The monitoring system of claim 10, wherein the communication port is selected from a group consisting of: a voice call, a video call, a real time messenger, a text message, and an email.

12. The monitoring system of claim 1, wherein the wide area communication circuitry is capable of transmitting at a distance of greater than one half of a mile.

13. A method for monitoring an individual, the method comprising:
   receiving a first data set via a first wireless wide area network communication circuit included in a user detached monitor device, wherein the user detached monitor device is associated with an individual being monitored;
   transmitting a subset of the first data set from the user detached monitor device to a user attached monitor device via a first local communication circuit included in the user attached monitor device and a second local communication circuit included in the user detached monitor device, wherein the subset of the first data set includes instructions for operating the user attached monitor device; and
   wherein the user attached monitor device is attached to a limb of the individual being monitored using an attachment element;
   wherein when an attempt to remove the user attached monitor device from the limb of the individual being monitored is detected, the user attached monitor device communicates a tamper violation;
   receiving a second data set via a second wireless wide area network communication circuit included in the user attached monitor device; and
   transmitting a subset of the second data set from the user attached monitor device to the user detached monitor device via the first local communication circuit included in the user attached monitor device and the second local communication circuit included in the user detached monitor device.

14. The method of claim 13, wherein the first data set is received from a central monitoring station.

15. The method of claim 14, wherein the tamper violation is communicated to the central monitoring station via a wireless wide area network.

16. A method for monitoring an individual, the method comprising:
   using an attachment element to secure a user attached monitor device around a limb of the individual, wherein the user attached monitor device includes:
   a cellular telephone network communication circuitry; and
   a local communication circuitry operable to communicate with a user detached monitor device over a local communication link; and
   receiving an alert from the user attached monitor device indicating a violation by the individual;

sending a context of the alert to a user detached monitor device associated with the individual, wherein the user detached monitor device includes:
a display; and
a non-transitory computer readable medium including instructions executable by a processor to:
receive the context of the alert;
format the context of the alert for the display;
display the formatted context of the alert via the display; and
display guidance to resolve the violation corresponding to the context of the alert.

17. The method of claim 16, wherein the violation is a violation of an exclusion zone, wherein the non-transitory computer readable medium is a first non-transitory computer readable medium, wherein the processor is a first processor, and wherein the user attached monitor device further includes:
a location determination circuit operable to determine a location of the user attached monitor device; and
a second non-transitory computer readable medium including instructions executable by a second processor of the user attached monitor device to determine the violation of the exclusion zone based at least in part on the location of the user attached monitor device.

18. The method of claim 17, wherein the context of the alert includes the location of the user attached monitor device.

19. The method of claim 16, wherein the user attached monitor device further includes:
a location determination circuit operable to determine a location of the user attached monitor device; and
wherein the method further includes:
transmitting the location of the user attached monitor device to a central monitoring station via a cellular telephone network using the cellular telephone network communication circuitry.

* * * * *